(12) United States Patent
Muramatsu et al.

(10) Patent No.: US 7,440,369 B2
(45) Date of Patent: Oct. 21, 2008

(54) INFORMATION RECORDING DEVICE AND METHOD, AND COMPUTER PROGRAM

(75) Inventors: Eiji Muramatsu, Saitama (JP); Kazuo Kuroda, Saitama (JP); Shoji Taniguchi, Saitama (JP); Masahiro Kato, Saitama (JP); Kunihiko Horikawa, Saitama (JP)

(73) Assignee: Pioneer Corporation, Tokyo (JP)

( * ) Notice: Subject to any disclaimer, the term of this patent is extended or adjusted under 35 U.S.C. 154(b) by 204 days.

(21) Appl. No.: 10/553,872

(22) PCT Filed: Dec. 20, 2004

(86) PCT No.: PCT/JP2004/019024

§ 371 (c)(1),
(2), (4) Date: Jul. 3, 2006

(87) PCT Pub. No.: WO2005/064606

PCT Pub. Date: Jul. 14, 2005

(65) Prior Publication Data

US 2007/0064560 A1 Mar. 22, 2007

(30) Foreign Application Priority Data

Dec. 26, 2003 (JP) .............................. 2003-434985

(51) Int. Cl.
*G11B 5/09* (2006.01)
*G11B 7/00* (2006.01)

(52) U.S. Cl. .................. 369/47.53; 369/47.5; 369/59.1; 369/116

(58) Field of Classification Search ....................... None
See application file for complete search history.

(56) References Cited

U.S. PATENT DOCUMENTS

2002/0136122 A1* 9/2002 Nakano ................... 369/47.53
2003/0185121 A1* 10/2003 Narumi et al. ........... 369/47.53

FOREIGN PATENT DOCUMENTS

| EP | 1 318 509 | 6/2003 |
| JP | 2003-022532 | 1/2003 |
| JP | 2004-171740 | 6/2004 |

* cited by examiner

*Primary Examiner*—Muhammad N. Edun
(74) *Attorney, Agent, or Firm*—Young & Thompson

(57) ABSTRACT

An information recording device comprising a recording unit that records recording information by applying a laser beam to an information recording medium having a first recording layer for recording recording information by being irradiated with a laser beam and a second recording layer for recording recording information by irradiating with a laser beam via the first recording layer, a calculating unit that calculates an optimum laser beam power when, by using the recording means, trial-recording trial information is recorded by irradiating the second recording layer with a laser beam via a recording-information-unrecorded recording area in the first recording layer and recording information is recorded by irradiating the second recording layer with a laser beam via a recording-information-recorded recording area in the first recording layer, and a control unit that controls the recording unit.

6 Claims, 9 Drawing Sheets

[FIG. 1]
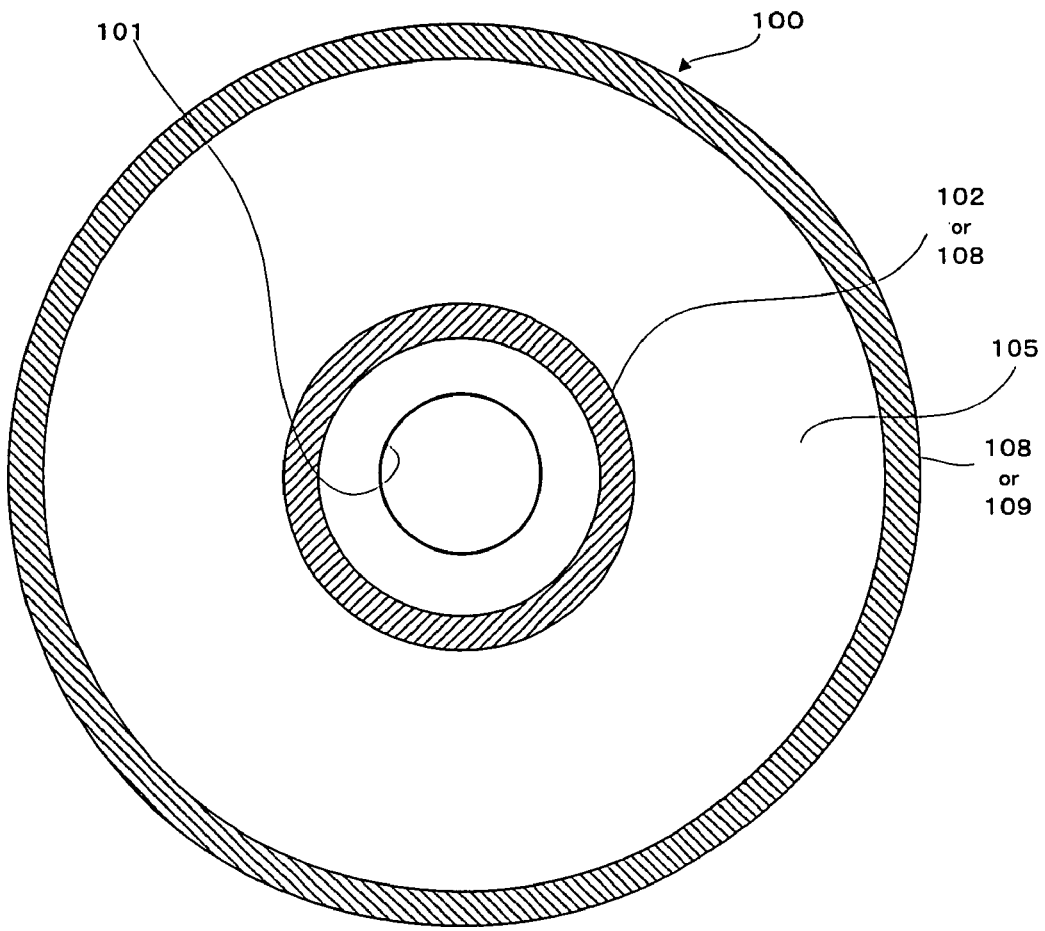
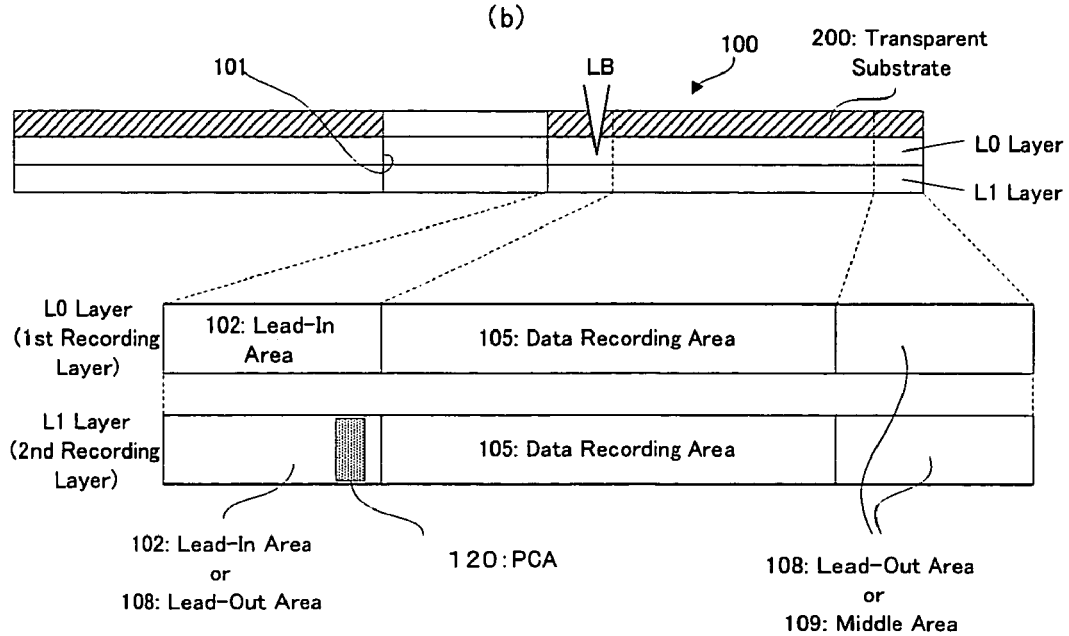

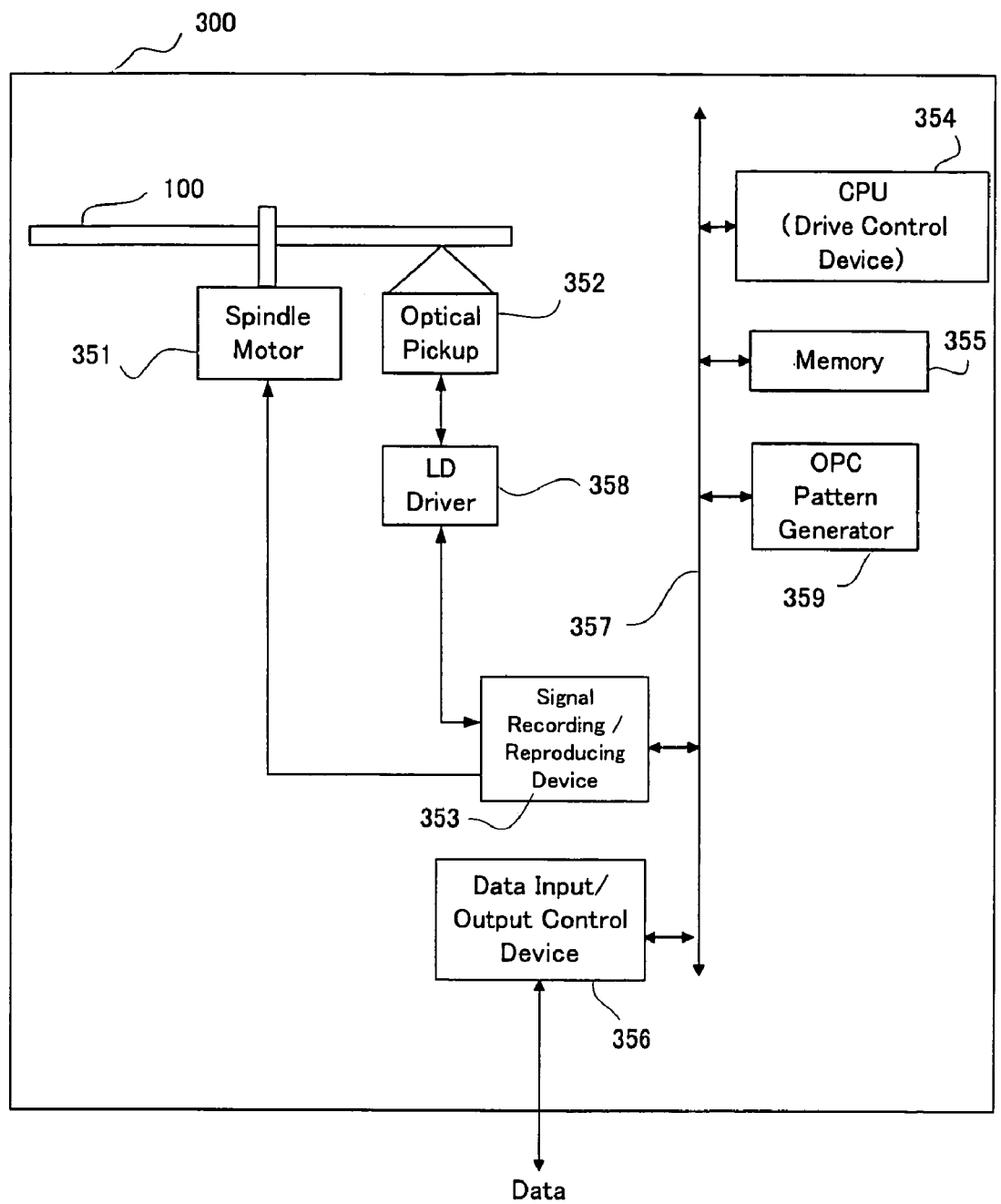

[FIG. 3]
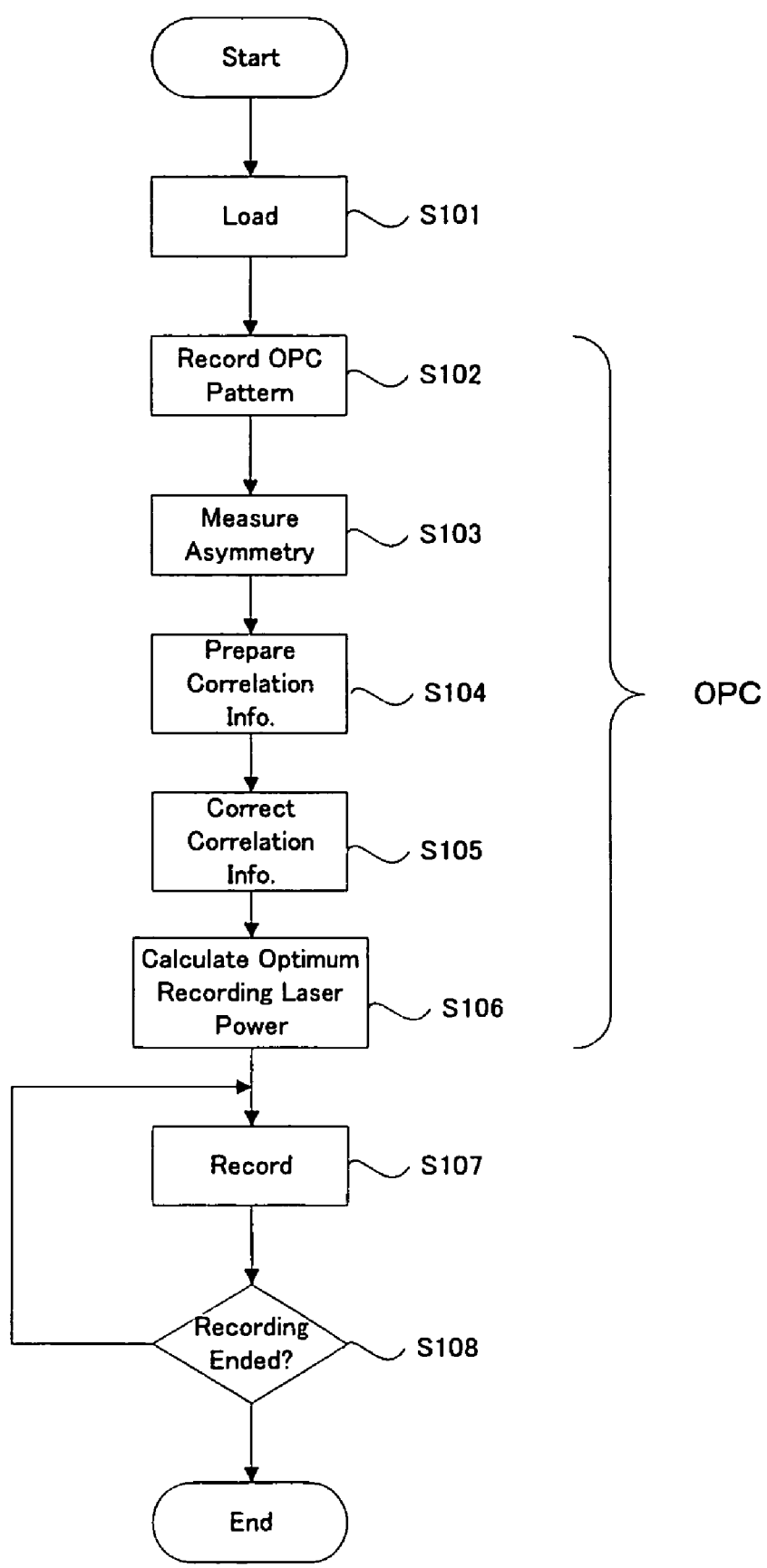

[FIG. 4]
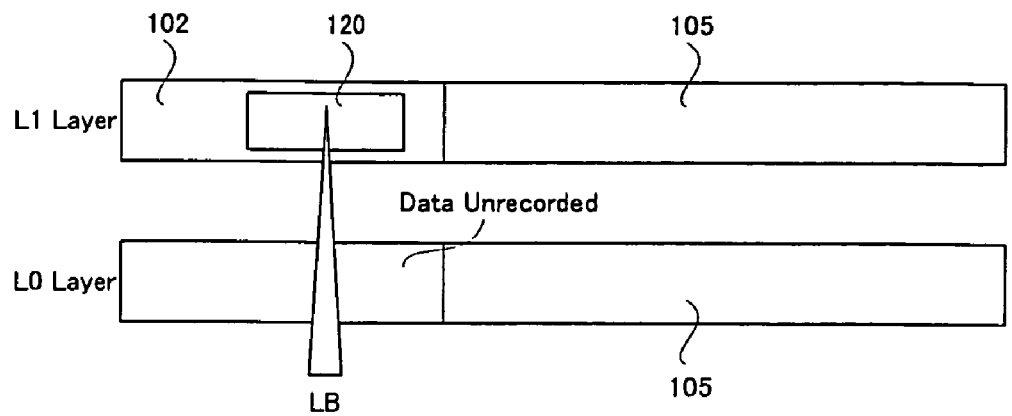
(a)
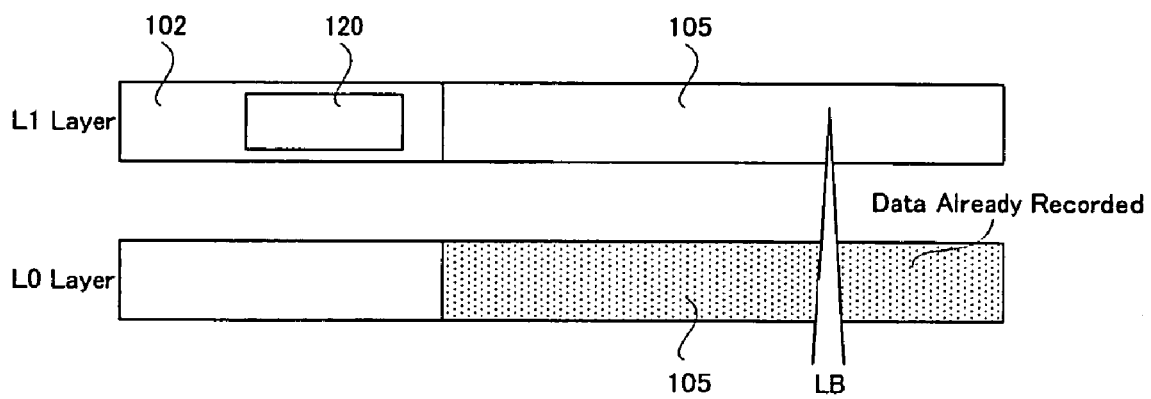
(b)

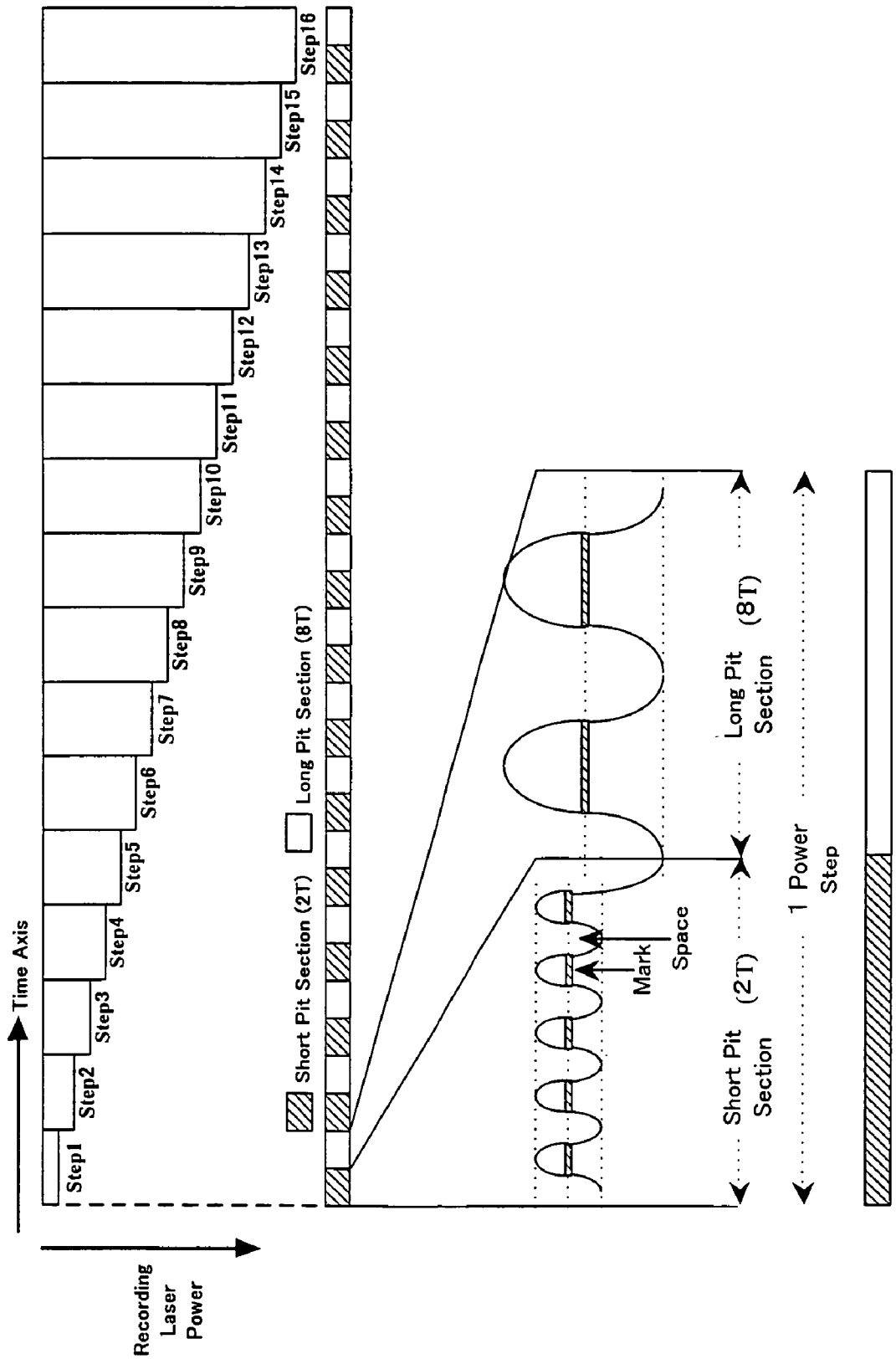
[FIG. 5]

[FIG. 6]
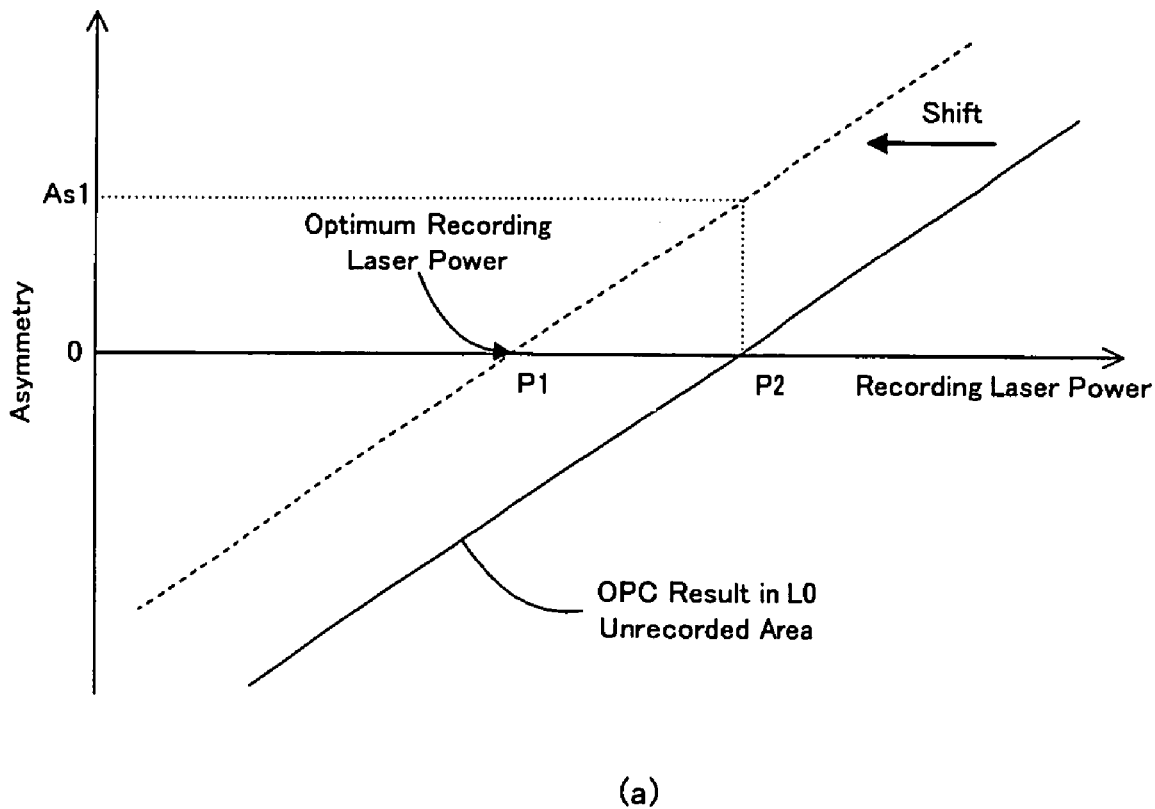
(a)
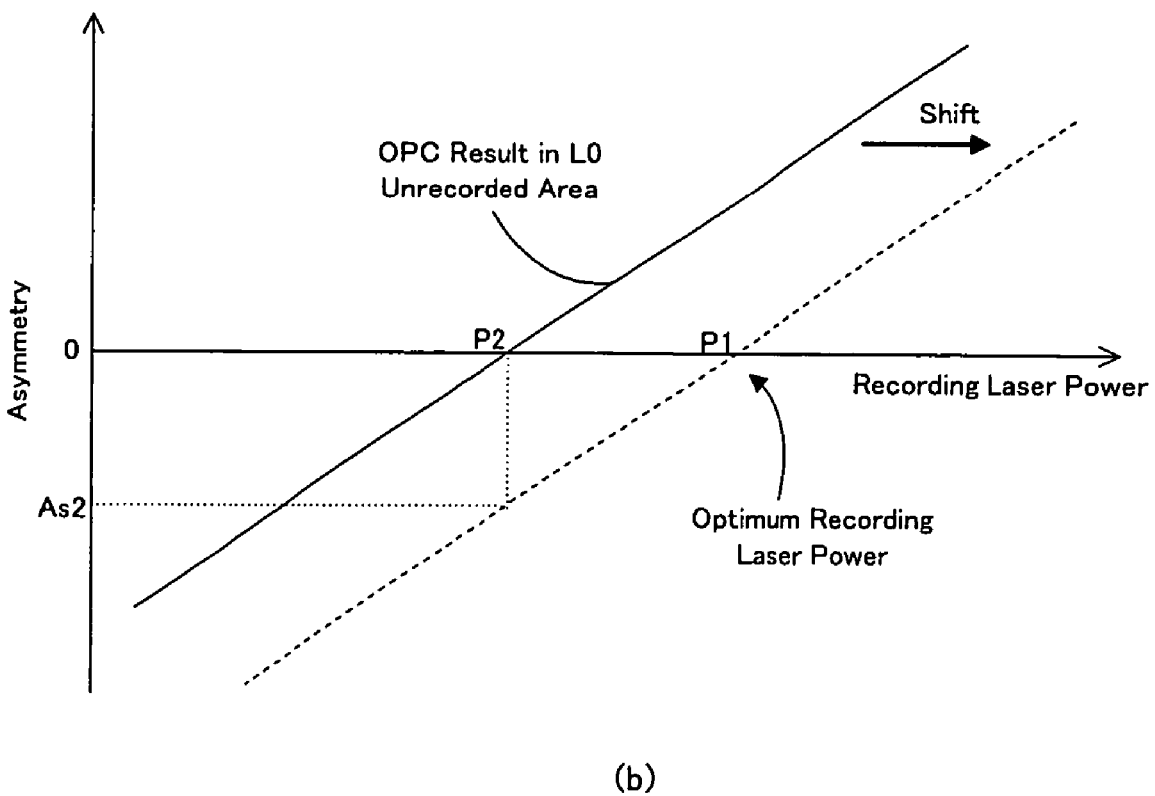
(b)

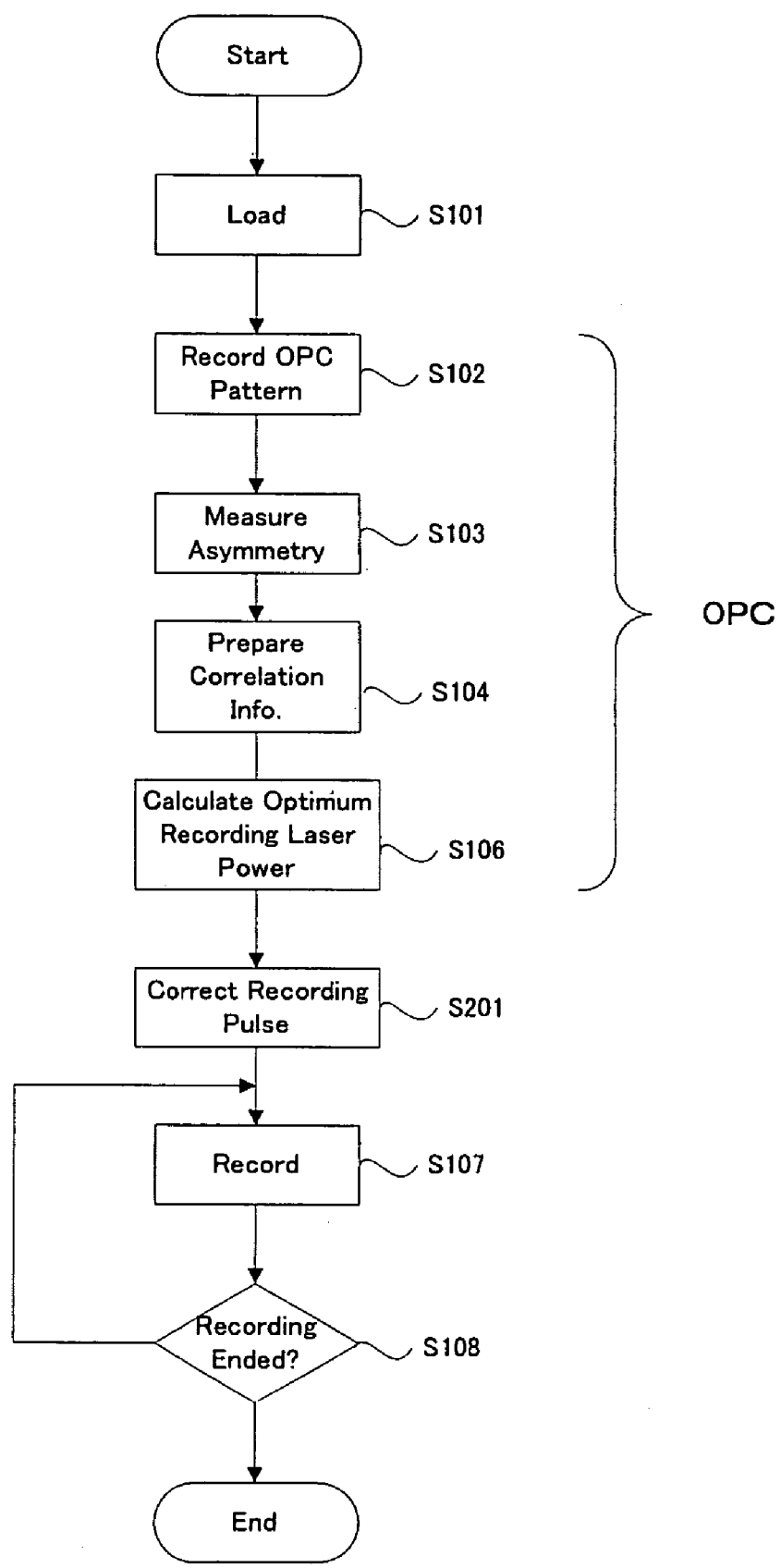
[FIG. 7]

[FIG. 8]
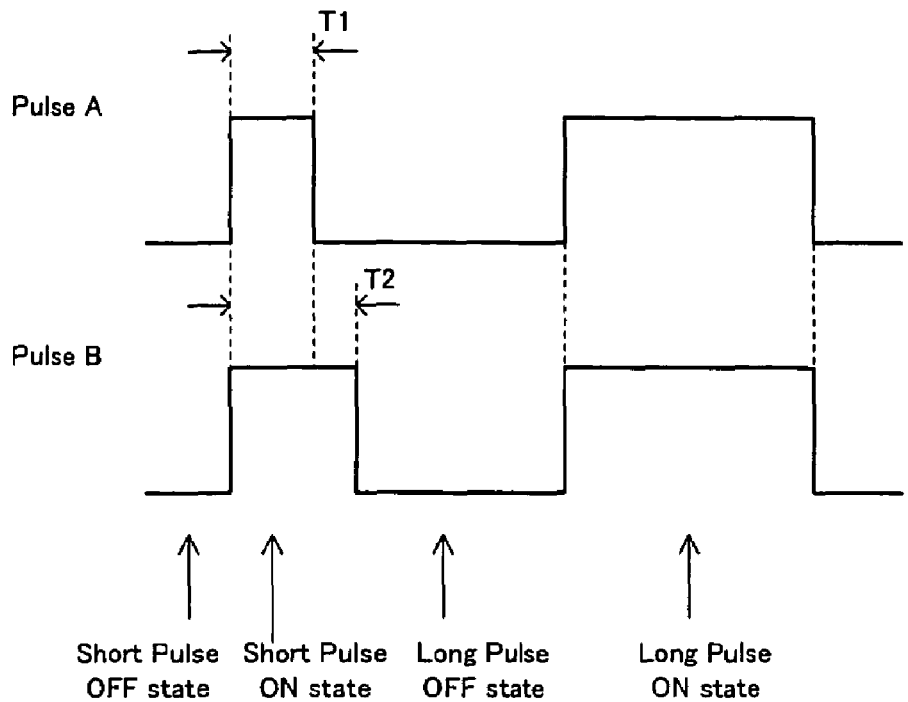
[FIG. 9]
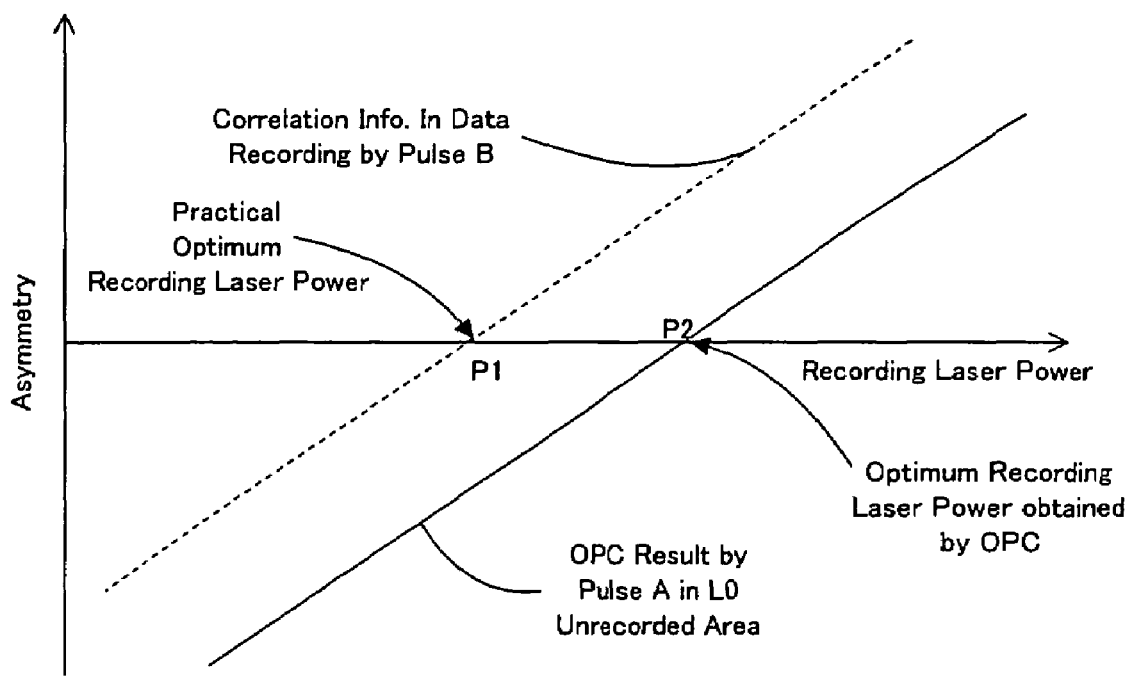

[FIG. 10]
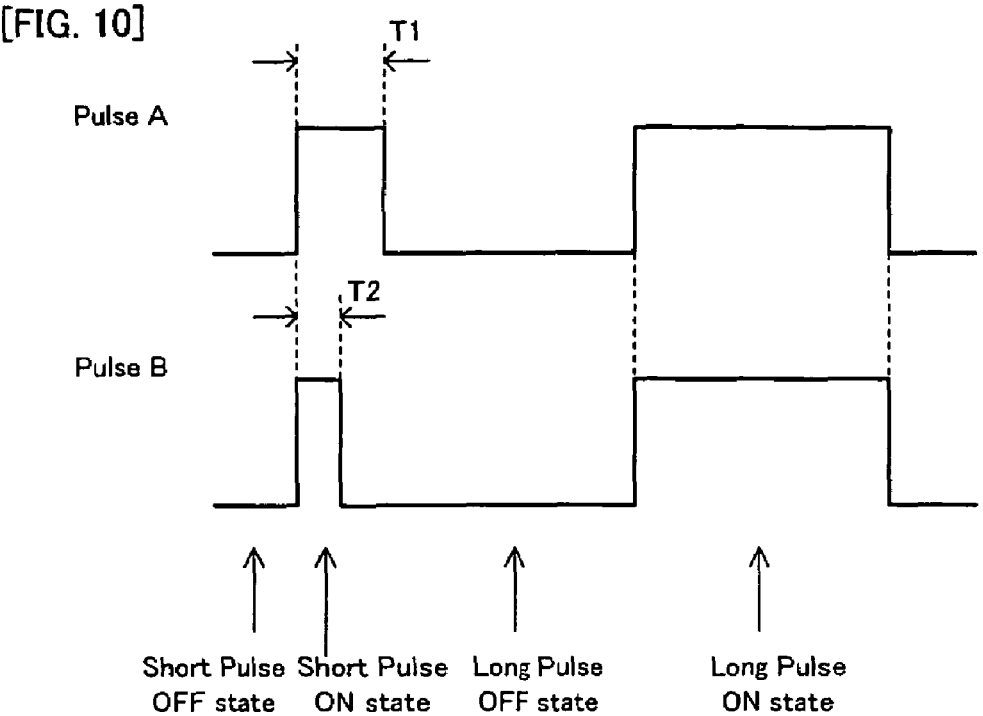
[FIG. 11]
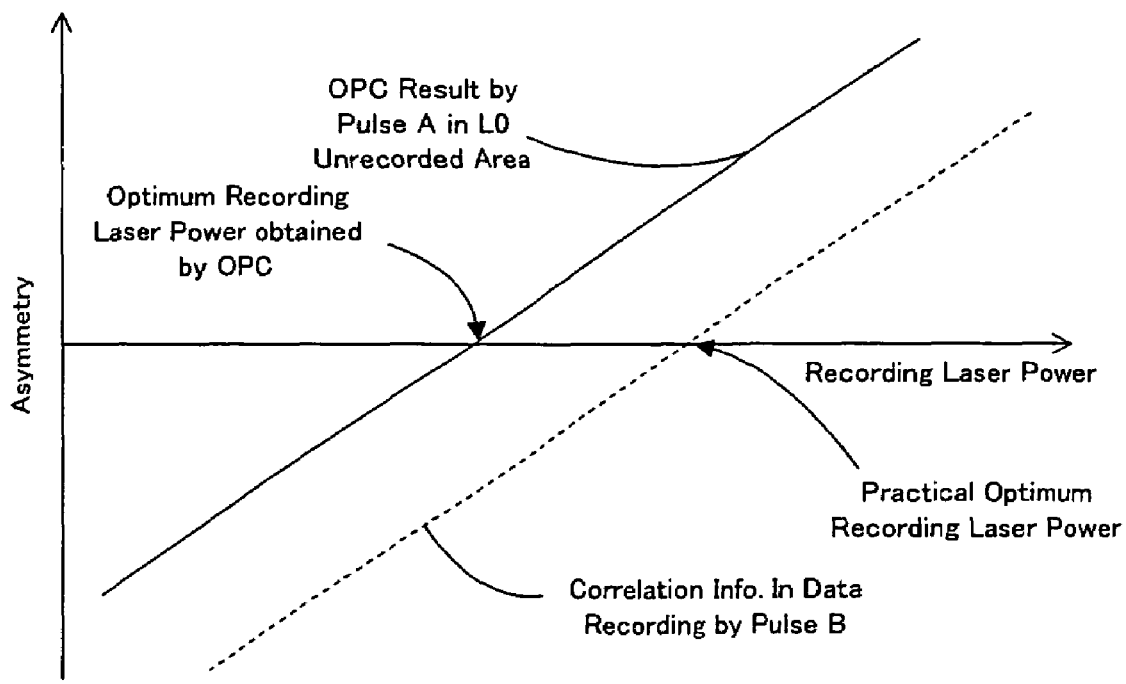

INFORMATION RECORDING DEVICE AND METHOD, AND COMPUTER PROGRAM

TECHNICAL FIELD

The present invention relates to an information recording apparatus and method, such as a DVD recorder, and a computer program which makes a computer function as the information recording apparatus.

BACKGROUND ART

For example, in the information recording medium, such as an optical disc, like a CD-ROM (Compact Disc-Read Only Memory), a CD-R (Compact Disc-Recordable), a DVD-ROM and the like, there are developed a multiple layer or multi-layer type, or dual layer type optical disc and so on, in which a plurality of recording layers are laminated on the same substrate. More specifically, such a dual layer type (i.e. two-layer type) optical disc has a first recording layer (referred to as a "L0 layer" in this application, as occasion demands), as the first layer, which is located on the front (i.e. a side closer to an optical pickup) as viewed from a laser light emission or irradiation side in recording information by the information recording apparatus, and further has a semi-transparent reflective coating or film, located on the rear thereof (i.e. a side farther from the optical pickup). As the second layer, it has a second recording layer (referred to as a "L1 layer" in this application), located on the rear of the semi-transparent reflective coating via a middle layer, such as an adhesive layer, and further has a reflective film located on the rear thereof. In preparing such a multi-layer type information recording medium, the L0 layer and the L1 layer are individually formed and pasted in the end, to thereby prepare the dual layer type optical disc at a low cost.

In the information recording apparatus, such as a CD recorder, for recording information onto such a dual layer type optical disc, the information is recorded into the L0 layer in a rewritable method or irreversible change recording method by irreversible change recording heat using heat or the like, by focusing the laser light for recording onto the L0 layer, and the information is recorded into the L1 layer in a rewritable method or irreversible change recording method by irreversible change recording heat using heat or the like, by focusing the laser light onto the L1 layer.

On the other hand, in an information recording/reproducing apparatus for recording information onto the information recording medium, such as an optical disc, the optimum power of a recording power is set by an OPC (Optimum Power Control) process, depending on the type of the optical disc and the type and recording rate of the information recording/reproducing apparatus, and so on. That is, the calibration for the recording power is performed. By this, it is possible to realize an appropriate recording operation on the optical disc. For example, if the optical disc is loaded and a writing command is inputted, data for test writing is recorded into an OPC area, with sequentially changing the optical intensity, so that a so-called "test writing process" is performed. Then, the data for test writing recorded in this manner is reproduced, and this reproduction result is judged by a predetermined estimation standard, to thereby set the optimum power (Japanese Patent No. 3159454). Moreover, even from the OPC performed at the same time of an actual recoding operation (so-called running OPC), the optimum power can be set.

DISCLOSURE OF INVENTION

Object to be Solved by the Invention

On such a dual layer type optical disc, the recording condition of the recording layer on the rear (e.g. the L1 layer) as viewed from the laser light irradiation side depends on the state of the recording layer on the front (e.g. the L0 layer) as viewed from the laser light irradiation side. In other words, there is such a technical problem that the optimum power varies in recording the data into the L1 layer, depending on the recording state of the L0 layer. This even leads to the situation that the data cannot be properly recorded in the L1 layer. Therefore, it is necessary to consider a difference in the recording condition, in performing the OPC on the dual layer type optical disc. However, according to the OPC in the above-mentioned related art, the difference in the recording condition is not considered. This is why there is such a technical problem that it is difficult or impossible to obtain a truly optimum recording power in each recording layer of the dual layer type optical disc.

It is therefore an object of the present invention to provide an information recording medium on which the data can be recorded at a proper recording power even if having a plurality of recording layers, as well as an information recording apparatus and method, and a computer program.

Means for Solving the Object

The above object of the present invention can be achieved by an information recording apparatus, provided with: a recording device for recording record information, by irradiating laser light with a variable recording power, onto an information recording medium comprising: a first recording layer into which the record information is recorded; and a second recording layer into which the record information is recorded through the first recording layer; a calculating device for recording test information for test writing by irradiating the second recording layer with the laser light through a recording area in which the record information is unrecorded in the first recording layer with the recording device, to thereby calculate an optimum power of the laser light in recording the record information by irradiating the second recording layer with the laser light through a recording area in which the record information is already recorded in the first recording layer; and a controlling device for controlling the recording device to irradiate the laser light with the optimum power calculated by the calculating device, in recording the record information into the second recording layer.

The above object of the present invention can be also achieved by an information recording method in an information recording apparatus, provided with: a recording device for recording record information, by irradiating laser light with a variable recording power, onto an information recording medium comprising: a first recording layer into which the record information is recorded; and a second recording layer into which the record information is recorded through the first recording layer, the information recording method provided with: a calculating process of recording test information for test writing by irradiating the second recording layer with the laser light through a recording area in which the record information is unrecorded in the first recording layer with the recording device, to thereby calculate an optimum power of the laser light in recording the record information by irradiating the second recording layer with the laser light through a recording area in which the record information is already recorded in the first recording layer; and a controlling process of controlling the recording device to irradiate the second recording layer with the laser light, with the calculated optimum power and through the recording area in which the record information is already recorded in the first recording layer, in recording the record information into the second recording layer.

The above object of the present invention can be also achieved by a computer program of instructions for recording control and for tangibly embodying a program of instructions executable by a computer provided in the above-mentioned information recording apparatus of the present invention, to make the computer function as at least one of the recording device, the calculating device, and the controlling device.

These effects and other advantages of the present invention become more apparent from the following embodiments and examples.

BRIEF DESCRIPTION OF DRAWINGS

[FIG. 1] FIG. 1(a) is a substantial plan view showing the basic structure of an optical disc having a plurality of recording areas, as being an information recording medium targeted for the recording operation of an example of the information recording apparatus of the present invention, and FIG. 1(b) is a schematic cross sectional view of the optical disc and a corresponding conceptual diagram showing a recording area structure in the radial direction.

[FIG. 2] FIG. 2 is a block diagram conceptually showing the basic structure of the information recording apparatus in the example.

[FIG. 3] FIG. 3 is a flowchart conceptually showing an entire flow of a first operation example of the information recording apparatus in the example.

[FIGS. 4] FIG. 4(a) and FIG. 4(b) are cross sectional diagrams conceptually showing the recording operation of an OPC pattern into an L1 layer and the recording operation of data by the information recording apparatus in the example.

[FIG. 5] FIG. 5 is a schematic timing chart showing one OPC process in the case of 16 power steps by on the information recording apparatus in the example.

[FIGS. 6] FIG. 6(a) and FIG. 6(b) are graphs conceptually showing correlation information which indicates a correlation between asymmetry and a recording laser power used on the information recording apparatus in the example, and a correction process of correcting the correlation information.

[FIG. 7] FIG. 7 is a flowchart conceptually showing an entire flow of a second operation example of the information recording apparatus in the example.

[FIG. 8] FIG. 8 is an explanatory diagram showing one specific example of the waveform of a recording pulse before and after the correction, on the information recording apparatus in the example.

[FIG. 9] FIG. 9 is a graph conceptually showing the correlation information which indicates a correlation between asymmetry and a recording laser power used on the information recording apparatus in the example, and practical correlation information after the correction of the pulse waveform.

[FIG. 10] FIG. 10 is an explanatory diagram showing another specific example of the waveform of a recording pulse before and after the correction, on the information recording apparatus in the example.

[FIG. 11] FIG. 11 is a graph conceptually showing the correlation information which indicates a correlation between asymmetry and a recording laser power used on the information recording apparatus in the example, and practical correlation information after the correction of the pulse waveform.

DESCRIPTION OF REFERENCE CODES

100 Optical disc
102 Lead-in area
105 Data recording area
108 Lead-out area
109 Middle area
120 PCA
300 Information recording apparatus
352 Optical pickup
354 CPU
355 Memory
358 LD driver
359 OPC pattern generator

BEST MODE FOR CARRYING OUT THE INVENTION

The information recording medium, the information recording apparatus and method, and the computer program according to the embodiments of the present invention will be discussed in order hereinafter, as the best mode for carrying out the invention.

Embodiment of Information Recording Medium

An embodiment of an information recording apparatus of the present invention is provided with: a recording device for recording record information, by irradiating laser light with a variable recording power, onto an information recording medium comprising: a first recording layer into which the record information is recorded; and a second recording layer into which the record information is recorded through the first recording layer; a calculating device for recording test information for test writing by irradiating the second recording layer with the laser light through a recording area in which the record information is unrecorded in the first recording layer with the recording device, to thereby calculate an optimum power of the laser light in recording the record information by irradiating the second recording layer with the laser light through a recording area in which the record information is already recorded in the first recording layer; and a controlling device for controlling the recording device to irradiate the laser light with the optimum power calculated by the calculating device, in recording the record information into the second recording layer.

According to the embodiment of the information recording apparatus of the present invention, it is possible to record various record information in each of the plurality of recording layers (i.e. the first recording layer and second recording layer). For example, it is possible to record the record information into the first recording layer by irradiating the first recording layer with the laser light. On the other hand, it is possible to record the record information into the second recording layer by irradiating the second recording layer with the laser light through the first recording layer. In this case, as viewed from the laser light irradiation side or the laser light emission side, the second recording layer is on the rear (i.e. the farther side) of the first recording layer. More specifically, the test information is recorded by the recording device controlled by the calculating device, and the test information is reproduced by the operation of the calculating device, to thereby measure the reproduction quality thereof. Then, the optimum power in recording the record information into the first recording layer is calculated. The optimum power calculated at this time particularly corresponds to the optimum power in recording the record information into the second recording layer through the first recording layer in which the record information is already recorded. Then, the recording device is controlled by the operation of the controlling device, to thereby record the record information with the optimum power calculated by the calculating device.

Particularly in the embodiment, the test information is recorded by irradiating the second recording layer with the laser light through the first recording layer in which the record information is unrecorded. Thus, it is possible to avoid such a disadvantage that the calculated optimum power varies depending on the recording state of the first recording layer. In other words, it is possible to calculate the proper optimum power. In addition, the record information is recorded by irradiating the second recording layer with the laser light through the first recording layer in which the record information is already recorded. Thus, it is possible to avoid such a disadvantage that the quality of the record information to be recorded varies depending on the recording state of the first recording layer. As a result, there is such a great advantage that it is possible to properly record the record information into the second recording layer, regardless of the recording state of the first recording layer.

Consequently, according to the embodiment of the information recording apparatus of the present invention, it is possible to calculate the optimum recording power of each recording layer, relatively easily, with respect to the information recording medium having the plurality recording layers. As a result, it is possible to record the record information with the proper recording power.

In one aspect of the embodiment of the information recording apparatus of the present invention, the calculating device calculates the optimum power by correcting correlation information which indicates a correlation between reproduction quality of the test information and the recording power.

According to this aspect, by correcting the correlation information, it is possible to make up for a difference (or discrepancy or mismatch) between the recording condition when the test information is recorded and the recording condition when the record information is recorded. Therefore, it is possible to record the record information with the proper recording power particularly to the second recording layer.

In an aspect of the information recording apparatus in which the correlation information is corrected, as described above, the calculating device corrects the correlation information, on the basis of a difference between a feature of the laser light irradiated through the recording area in which the record information is unrecorded in the first recording layer and a feature of the laser light irradiated through the recording area in which the record information is already recorded in the first recording layer.

By virtue of such construction, it is possible to properly correct the correlation information, on the basis of the features of the laser light according to the recording state of the first recording layer.

In an aspect of the information recording apparatus in which the correlation information is corrected, as described above, transmittance for the laser light is reduced in the first recording layer by recording the record information therein, and the calculating device corrects the correlation information to make the calculated optimum power greater than an optimum power indicated by the correction information before the correction.

By virtue of such construction, it is possible to properly correct the correlation information, in accordance with the features of the first recording layer. In other words, it can be considered that the recording power of the laser light irradiated through the first recording layer is reduced, because the transmittance in the first recording layer is reduced by recording the record information therein. Therefore, if the recording power is increased in accordance with that, it is possible to properly record the record information.

In an aspect of the information recording apparatus in which the correlation information is corrected, as described above, transmittance for the laser light is increased in the first recording layer by recording the record information therein, and the calculating device corrects the correlation information to make the calculated optimum power less than an optimum power indicated by the correction information before the correction.

By virtue of such construction, it is possible to properly correct the correlation information, in accordance with the features of the first recording layer. In other words, it can be considered that the recording power of the laser light irradiated through the first recording layer is increased, because the transmittance in the first recording layer is increased by recording the record information therein. Therefore, if the recording power is reduced in accordance with that, it is possible to properly record the record information.

In another aspect of the embodiment of the information recording apparatus of the present invention, the controlling device controls the recording device to irradiate the laser light having a predetermined waveform which is different from a waveform of the laser light for recording the test information.

According to this aspect, by correcting the correlation information, it is possible to make up for a difference (or discrepancy or mismatch) between the recording condition when the test information is recorded and the recording condition when the record information is recorded. Therefore, it is possible to record the record information with the proper recording power particularly to the second recording layer. In other words, since it is enough to adjust the waveform of the laser light, it is possible to record the record information with the proper recording power, relatively easily.

In an aspect of the information recording apparatus in which the correlation information is corrected, as described above, the calculating device controls the recording device to irradiate the laser light having the different predetermined waveform, on the basis of a difference between a feature of the laser light irradiated through the recording area in which the record information is unrecorded in the first recording layer and a feature of the laser light irradiated through the recording area in which the record information is already recorded in the first recording layer.

By virtue of such construction, it is possible to properly correct the correlation information, on the basis of the features of the laser light according to the recording state of the first recording layer.

In an aspect of the information recording apparatus in which the laser light having the different predetermined waveform is irradiated, as described above, the waveform of the laser light includes a combination of a short pulse and a long pulse, and the controlling device controls the recording device such that the short pulse in the predetermined waveform is longer or shorter on a time axis, as compare to the waveform of the laser light for recording the test information.

By virtue of such construction, it is possible to change the waveform of the laser light, relatively easily. Since the increase or decrease of the recording power can be adjusted depending on the length of the waveform, it is possible to record the record information with the proper recording power, relatively easily.

In an aspect of the information recording apparatus in which the laser light having the different predetermined waveform is irradiated, as described above, the controlling device controls the recording device to make the short pulse in the predetermined waveform longer or shorter than the waveform of the laser light for recording the test information, by a ratio equal to or greater than 5% and equal to or less than 10%.

By virtue of such construction, it is possible to properly change the waveform of the laser light, in accordance with the recording state of the first recording layer.

Embodiment of Information Recording Method

An embodiment of an information recording method is a method in an information recording apparatus, comprising: a recording device for recording record information, by irradiating laser light with a variable recording power, onto an information recording medium comprising: a first recording layer into which the record information is recorded; and a second recording layer into which the record information is recorded through the first recording layer, the information recording method provided with: a calculating process of recording test information for test writing by irradiating the second recording layer with the laser light through a recording area in which the record information is unrecorded in the first recording layer with the recording device, to thereby calculate an optimum power of the laser light in recording the record information by irradiating the second recording layer with the laser light through a recording area in which the record information is already recorded in the first recording layer; and a controlling process of controlling the recording device to irradiate the second recording layer with the laser light, with the calculated optimum power and through the recording area in which the record information is already recorded in the first recording layer, in recording the record information into the second recording layer.

According to the embodiment of the information recording method of the present invention, it is possible to receive the same various benefits as those of the above-mentioned embodiment of the information recording apparatus of the present invention.

Incidentally, in response to the various aspects in the embodiment of the information recording apparatus of the present invention described above, the embodiment of the information recording method of the present invention can adopt various aspects.

Embodiment of Computer Program

An embodiment of a computer program of the prevent invention is a computer program of instructions for recording control and for tangibly embodying a program of instructions executable by a computer provided in the above-mentioned embodiment of the information recording apparatus of the present invention (including its various aspects), to make the computer function as at least one of the recording device, the calculating device, and the controlling device.

According to the embodiment of the computer program of the present invention, the above-mentioned embodiment of the information recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects in the embodiment of the information recording apparatus of the present invention described above, the embodiment of the computer program of the present invention can adopt various aspects.

The above object of the present invention can be also achieved by a computer program product in a computer-readable medium for tangibly embodying a program of instructions executable by a computer provided in the above-mentioned information recording apparatus of the present invention (including its various aspects), to make the computer function as at least one of the recording device, the calculating device, and the controlling device.

According to the computer program product of the present invention, the above-described information recording apparatus of the present invention can be embodied relatively readily, by loading the computer program product from a recording medium for storing the computer program product, such as a ROM (Read Only Memory), a CD-ROM (Compact Disc—Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the above-described information recording apparatus.

These effects and other advantages of the present invention become more apparent from the following examples.

As explained above, the embodiment of the information recording apparatus of the present invention is provided with: the recording device; the calculating device; and the controlling device. The embodiment of the information recording method of the present invention is provided with: the calculating process; and the controlling process. Therefore, even on the information recording medium having the plurality of recording layers, it is possible to properly calculate the optimum power.

EXAMPLES

Examples of the present invention will be explained hereinafter with reference to the drawings.

At first, with reference to FIG. 1(a) and FIG. 1(b), the basic structure of the information recording medium, targeted for the recording operation of an example of the information recording apparatus of the present invention, will be discussed. FIG. 1(a) is a substantial plan view showing the basic structure of an optical disc having a plurality of recording areas, as being the information recording medium targeted for the recording operation of the example of the information recording apparatus of the present invention, and FIG. 1(b) is a schematic cross sectional view of the optical disc and a corresponding conceptual diagram showing a recording area structure in the radial direction.

As shown in FIG. 1(a) and FIG. 1(b), an optical disc 100 has a recording surface on a disc main body with a diameter of about 12 cm, as is a DVD. On the recording surface, the optical disc 100 is provided with: a lead-in area 102; a data recording area 105; and a lead-out area 108 or a middle area 109, with a center hole 101 as the center. Then, for example, on a transparent substrate 200 of the optical disc 100, there are laminated recording layers and the like. In each recording area of the recording layers, tracks, such as groove tracks and land tracks, are alternately placed, spirally or concentrically, with the center hole 101 as the center. On the track, data is divided and recorded by a unit of ECC block. The ECC block is a data management unit by a pre-format address in which record information is error-correctable.

Moreover, a PCA (Power Calibration Area) 120 into which an OPC pattern described later is recorded is disposed in the lead-in area 102 of the L1 layer. The PCA 120 is particularly used in calculating the optimum recording laser power of the L1 layer. Obviously, a PCA, particularly used in calculating the optimum recording laser power of the L0 layer, may be disposed in the lead-in area 102 of the L0 layer. Moreover, the location of the PCA is not limited to being in the lead-in area 102, but may be in other areas.

Incidentally, the present invention is not particularly limited to the optical disc having these three areas. For example, even if the lead-in area 102, the lead-out area 108 or the middle area 109 does not exist, a data structure explained below can be constructed. Moreover, as described later, the lead-in area 102, the lead-out area 108 or the middle area 109 may be further segmentized.

Particularly, the optical disc 100 in the example, as shown in FIG. 1(*b*), has such a structure that the L0 layer and the L1 layer, which constitute one example of the "first recording layer and second record layer" of the present invention as described later, respectively, are laminated on the transparent substrate. Upon the recording/reproduction of such a dual layer type optical disc 100, the recording/reproduction in the L0 layer or the L1 layer is performed, depending on which recording layer has the focus position of laser light LB, irradiated from the upper side to the lower side in FIG. 1(*b*).

Moreover, the optical disc 100 in the example is not limited to a dual layer single sided type, but may be a dual layer double sided type. Furthermore, the optical disc 100 in the example is not limited to the optical disc having the two recording layers, as described above, but may be an optical disc of a multi-layer type which has three or more layers. Moreover, it may be in an opposite track path manner or parallel track path manner in the dual layer type optical disc.

Example of Information Recording Apparatus

Next, the example of the information recording apparatus of the present invention will be discussed with reference to FIG. 2 to FIG. 7.

(1) Basic Structure

At first, with reference to FIG. 2, the basic structure of the information recording apparatus in the example will be discussed. FIG. 2 is a block diagram conceptually showing the basic structure of the information recording apparatus in the example.

As shown in FIG. 2, an information recording apparatus 300 is an apparatus for recording information onto an optical disc 100 and for reading the information recorded on the optical disc 100, under the control of a processor 354.

The information recording apparatus 300 is provided with: the optical disc 100; a spindle motor 351; an optical pickup 352; a signal recording/reproducing device 353; the CPU (drive control device) 354; a memory 355; a data input/output control device 356; a Laser Diode (LD) driver 358; an OPC pattern generator 359; and a bus 357.

The spindle motor 351 is intended to rotate and stop the optical disc 100, and operates upon accessing the optical disc. More specifically, the spindle motor 351 is constructed to rotate the optical disc 100 at a predetermined speed and stop it, under spindle servo from a not-illustrated servo unit or the like.

The optical pickup 352 is one specific example of the "recording device" of the present invention. The optical pickup 352 is to perform the recording/reproduction with respect to the optical disc 100, and is provided with a laser device, a lens, and the like. More specifically, the optical pickup 352 irradiates the optical disc 100 with a light beam, such as a laser beam, as reading light with a first power upon reproduction, and as writing light with a second power upon recording, with it modulated.

The signal recording/reproducing device 353 controls the spindle motor 351 and the optical pickup 352, to thereby perform the recording/reproduction with respect to the optical disc 100.

The CPU (drive control device) 354 is one specific example of the "controlling device" of the present invention. The CPU 354 is connected to the signal recording/reproducing device 353 and the memory 355 through the bus 357, and controls the entire information recording apparatus 300 by giving an instruction to each controlling device. In general, software for operating the CPU 354 is stored in the memory 355.

The memory 355 is used in the whole data processing on the disc drive 300, including a buffer area for the record/reproduction data, an area used as an intermediate buffer when data is converted into the data that can be used on the signal recording/reproducing device 353, and the like. Moreover, the memory 355 is provided with: a ROM area into which a program for performing an operation as a recording device is stored; a buffer used for compression/decompression of video data; a RAM area into which a parameter required for the operation of a program or the like is stored; and the like.

Particularly in the example, the memory 355 includes a semiconductor memory, such as a ROM, a RAM, and a flash memory, and may have the above-mentioned calculation information 120 recorded therein. However, if the calculation information 120 is recorded on the optical disc 100, the calculation information is not necessarily recorded in the memory 355.

In the data input/output control device 356, the data to be recorded onto the optical disc 100 is inputted from external equipment or the like. Then, the data input/output control device 356 outputs the inputted data to the signal recording/reproducing device 353 through the bus 357. Incidentally, if the data recorded on the optical disc 100 can be reproduced, the data input/output control device 356 may be constructed to output the reproduced data to external output equipment, such as a liquid crystal display.

The OPC pattern generator 359 is one specific example of the "calculating device" of the present invention. The OPC pattern generator 359 is used to generate a predetermined OPC pattern, which is one specific example of the "test information" of the present invention, by using various strategies described later.

The LD driver 358 oscillates the laser diode or the like of the optical pickup 352 at a predetermined frequency, to thereby control the laser beam irradiated from the optical pickup 352.

The information recording apparatus 300 in the example, explained with reference to FIG. 2, is also an example of an information recording/reproducing apparatus. Namely, the information recording apparatus 300 can reproduce the record information through the signal recording/reproducing device 353 (e.g. a head amplifier, a Radio Frequency (RF) detector, or the like). The information recording apparatus 300 in the example includes the function of an information reproducing apparatus or the function of the information recording/reproducing apparatus.

(2) First Operation Example

Next, with reference to FIG. 3 to FIG. 6, the first operation example of the information recording apparatus 300 in the example will be discussed. Incidentally, in the first operation example, a recording operation of recording the data into the L1 layer will be specifically discussed.

At first, with reference to FIG. 3 and FIG. 4, the entire flow of the first operation example of the information recording apparatus 300 in the example will be discussed. FIG. 3 is a flowchart conceptually showing an entire flow of the first operation example. FIG. 4(a) and FIG. 4(b) are cross sectional diagrams conceptually showing the recording of an OPC pattern into the L1 layer and the recording operation of data into the L1 layer.

As shown in FIG. 3, at first, the optical disc 100 is loaded (step S101). At this time, a seek operation is performed by the optical pickup 352 under the control of the CPU 354, to thereby obtain various data for management, necessary for a recording process onto the optical disc 100. On the basis of the data for management, the data is recorded onto the optical disc 100 through an interface, in accordance with an instruction from external input equipment or the like, under the control of the CPU 354.

Then, an OPC process is performed to calculate an optimum recording laser power in recording the data into the L1 layer. Specifically, at first, a predetermined OPC pattern is recorded into a PCA located in the lead-in area 102 (step S102).

Particularly in the example, as shown in FIG. 4(a), in recording the OPC pattern into PCA 120 of the L1 layer, the laser light LB is irradiated through the L0 layer in which the data is unrecorded. On the other hand, in recording the data into the L1 layer (particularly, the data recording area 105), as shown in FIG. 4(b), the laser light is irradiated through the L0 layer in which the data is already recorded.

Now, the recording of the OPC pattern will be specifically discussed, with reference to FIG. 5. FIG. 5 is a schematic timing chart showing one OPC process in the case of 16 power steps.

As shown in FIG. 5, at first, under the control of the CPU 354, the optical pickup 352 is displaced to the PCA 120 located in the lead-in area 102 of the L1 layer. Then, by the operations of the OPC pattern generator 359 and the LD driver 358, the recording laser power is changed sequentially and gradually (e.g. mutually different 16-step recording laser powers), to thereby record the OPC pattern into the PCA 120. Specifically, an OPC pattern as shown in FIG. 5 is recorded. For example, there is a recording pattern in which a section of short pits (marks) corresponding to a 2T pulse and a section of long pits (marks) corresponding to an 8T pulse are alternately formed with an unrecorded section (space) with the same length of each pit.

The LD driver 358 drives a semiconductor laser in the optical pickup 352 in order to change the recording laser power sequentially and gradually, by using the OPC pattern outputted from the OPC pattern generator 359.

In FIG. 3 again, then, asymmetry is measured, which is the reproduction quality of the OPC pattern recorded at the step S102 (step S103). Specifically, the OPC pattern which is test-written in the PCA 120 is reproduced, under the control of the CPU 354. Then, the peak value and bottom value of envelope detection of an RF signal are sampled from the RF signal which is a reproduction signal and which is inputted to a not-illustrated envelop detector. The asymmetry is calculated by the peak value and bottom value. The reproduction of the OPC pattern and the measurement of the asymmetry as described above are performed in accordance with the number of times to record the OPC pattern in one OPC process, for example.

Then, correlation information which indicates a correlation between the recording laser power and the asymmetry is prepared (step S104). Specifically, the asymmetry value of the OPC pattern which is recorded with each of the 16-step recording laser powers is sampled, and a relationship between the recording laser power and the sampled asymmetry value is calculated, to thereby prepare the correlation information. Then, for the obtained correlation information, a correction process according to the recording features (or the recording characteristics) of the L1 layer is performed (step S105). The correction process for the correlation information will be discussed in detail later (refer to FIG. 6(a) and FIG. 6(b)). Then, on the basis of the corrected correlation information, the optimum recording laser power in recording the data into the L1 layer is calculated (step S106). For example, the optimum recording laser power having almost minimum asymmetry is calculated.

Then, the recording operation of recording the data is performed with the optimum recording laser power obtained at the step S106 (step S107). Then, it is judged whether or not the recording operation is ended (step S108).

As a result of the judgment, if it is judged that the recording operation is not ended (the step S108: No), the operational flow returns to the step S107 to continue the recording operation. On the other hand, if it is judged that the recording operation is ended (the step S108: Yes), the recording operation is ended. At this time, for example, a finalize process or the like may be performed, or the optical disc 100 on which the recording operation is ended may be ejected.

Then, the correction process for the correlation information at the step S105 in FIG. 3 will be discussed in detail, with reference to FIG. 6(a) and FIG. 6(b). FIG. 6(a) and FIG. 6(b) are graphs conceptually showing the correlation information which indicates the correlation between the asymmetry and the recording laser power, and the correction process of correcting the correlation information.

As shown in FIG. 6(a), a graph indicated by a thick line shows the correlation information obtained by the OPC. The correlation information is obtained by the OPC which is performed by irradiating the laser light LB through the L0 layer in which the data is unrecorded. However, since the laser light LB is irradiated through the L0 layer in which the data is already recorded in actually recording the data into the L1 layer, it can hardly said that the optimum recording laser power obtained by the correlation information is always optimum. Therefore, the correction of the correlation information at the step S105 in FIG. 3 is performed.

Specifically, under the control of the CPU 354, the graph of the correlation information is displaced (shifted) to the left (i.e. a side to reduce the value of the recording laser power) and parallel to the axis of the recording laser power. As a result, it is possible to obtain correlation information after the correction, indicated by a dashed line in FIG. 6(a). The correlation information after the correction is substantially equal to the correlation information obtained by the OPC performed by irradiating the laser light LB through the L0 layer in which the data is already recorded. For example, if the optimum recording laser power calculated from the correlation information before the correction is P2 and the optimum recording laser power calculated from the correlation information after the correction is P1, it is preferable to displace the correlation information to a degree to satisfy a formula shown in an equation 1.

$$0.05 \leq \frac{P2 - P1}{P2} \leq 0.1 \qquad \text{[Equation 1]}$$

After the correlation information is corrected in this manner, the value of the recording laser power which realizes a targeted asymmetry value is calculated as the optimum recording laser power. For example, as shown in FIG. 6(a), if the targeted asymmetry value is designated as "0", the optimum recording laser power is P1. Then, the output of the laser light LB is adjusted by the LD driver 358 under the control of the CPU 354 so that the data is recorded into the L1 layer with the calculated optimum recording laser power P1. By this, it is possible to record the data, stably and preferably, without deterioration of the recording quality of the data. Even in reproducing the data recorded in this manner, it is possible to relatively improve the reproduction quality thereof.

It is assumed that the correlation information is not corrected and the data is recorded into the L1 layer with the optimum recording laser power P2 calculated from the correlation information before the correction. In this case, since the L1 layer is irradiated with the laser light through the L0 layer in which the data is already recorded, the correlation information which reflects the actual recording state is like the graph shown in the dashed line in FIG. 6(a). Then, according to the correlation information shown by the graph in the dashed line, the asymmetry of the data recorded with the recording laser power P2 is "As1", which is different from the originally targeted value of "0". This indicates that the recording operation is not performed so as to realize the originally desired reproduction quality (e.g. the reproduction quality with the asymmetry of "0"). However, in the example, since the optimum recording laser power is calculated after the correction of the correlation information, such a disadvantage is not caused and it is possible to perform the recording operation which realizes the originally desired reproduction quality.

Moreover, since the laser light is irradiated through the L0 layer in which the data is unrecorded in calculating the optimum recording laser power of the L1 layer, it is possible to effectively prevent such a disadvantage that the result of the OPC varies depending on the recording state of the L0 layer. In other words, it is possible to prevent the variable results of the OPC caused by whether the laser light is irradiated through the L0 layer in which the data is already recorded or through the L1 layer in which the data is unrecorded. Thus, it is possible to preferably calculate the optimum recording laser power. Then, by correcting the correlation information in the above manner, it is possible to make up for a difference between the recording state of the L0 layer in the OPC and the recording state of the L0 layer in the data recording.

the laser light LB is irradiated through the L0 layer in which the data is already recorded in recording the data into the L1 layer, it is possible to effectively prevent such a disadvantage that the recording quality of the data in the L1 layer varies depending on the recording state of the L0 layer. Moreover, on the existing dual layer type optical disc, the recording operation is generally performed so as to record the data into the L1 layer on the rear after the data is recorded into the L0 layer on the front. Therefore, the information recording apparatus in the example also has such a great advantage that it is possible to preferably adapt to the general recording operation.

Incidentally, it is not limited to shift the graph of the correlation information to the left, but it may be constructed to shift the graph of the correlation information to the right as shown in FIG. 6(b). If the correlation information is shifted to the right, it is preferable to displace the correlation information to a degree to satisfy a formula shown in an equation 2, wherein the optimum recording laser power calculated from the correlation information before the correction is P2 and the optimum recording laser power calculated from the correlation information after the correction is P1.

$$0.05 \leq \frac{P1 - P2}{P2} \leq 0.1 \qquad \text{[Equation 2]}$$

In any case of these, it is possible to receive the above-mentioned various benefits. A difference in the direction of displacing the correlation information varies depending on the type of the material of the optical disc 100 (e.g. a pigment coating (a dye coating), reflective coating, permeable film, transparent substrate, and the like). For example, in some materials of the optical disc 100, recording the data into the L0 layer may cause discoloration of the pigment coating of the L0 layer, which may result in an increase of the transmittance of the L0 layer. At this time, it can be considered that the intensity of the laser light LB irradiated through the L0 layer in which the data is already recorded is greater than that of the laser light LB irradiated through the L0 layer in which the data is unrecorded. Therefore, in this case, it is preferable to displace the correlation information to the left (i.e. the side to reduce the recording laser power). On the other hand, in some materials of the optical disc 100, recording the data into the L0 layer may cause carbonization of the pigment coating of the L0 layer, which may result in a decrease of the transmittance of the L0 layer. At this time, it can be considered that the intensity of the laser light LB irradiated through the L0 layer in which the data is already recorded is less than that of the laser light LB irradiated through the L0 layer in which the data is unrecorded. Therefore, in this case, it is preferable to displace the correlation information to the right (i.e. the side to increase the recording laser power). Moreover, the material of the optical disc 100 and a change of the transmittance or the like may be measured or predicted, under the control of the CPU 354. For example, these may be measured or predicted, by irradiating the laser light LB in advance with a predetermined power value. Then, the direction of displacing the correlation information or the distance thereof or the like may be determined, as occasion demands, depending on measurement results and prediction results.

Consequently, according to the information recording apparatus in the example, even in the case of the dual layer type optical disc, it is possible to preferably calculate the optimum recording laser power of the recording layer on the rear (i.e. the L1 layer) as viewed from the irradiation side of the laser light LB, regardless of the recording state of the recording layer on the front (i.e. the L0 layer) as viewed from the irradiation side of the laser light LB. Specifically, it is possible to obtain a more preferable asymmetry value, reflectance, modulated amplitude, jitter value, or the like, as the features of the recorded data, and it is also possible to realize good recording sensitivity.

Incidentally, if the data is recorded into the L0 layer by the information recording apparatus 300 in the example, the above-mentioned OPC process is performed in the PCA located in the lead-in area 102 of the L0 layer, to thereby calculate the optimum recording laser power. Then, the data is recorded into the L0 layer with the calculated optimum recording laser power. In calculating the optimum recording laser power of the L0 layer, the above-mentioned correction process for the correlation information may be performed, or may not be performed. However, it is preferable to perform the correction process for the correlation information even in the OPC process in the L0 layer, if the recording features change in the data recording into the L0 layer depending on whether the data is already recorded or unrecorded in the corresponding L1 layer.

Moreover, in the example, the graph is used as the correlation information; however, the present invention is not limited to this. For example, a function which indicates the correlation between the recording laser power and the asymmetry may be used as the correlation information, or a list or table which indicates the correlation between the recording laser power and the asymmetry may be used as the correlation information. Even if these correlation information are used, it is possible to receive the above-mentioned various benefits by correcting these correlation information such that the optimum recording laser power has a preferable value, as described above. Moreover, in the example, the correlation information is corrected so that the asymmetry value of the data recorded with the optimum recording laser power becomes "0"; however, obviously, the present invention is not limited to this. For example, in the case of a DVD as being one specific example of the optical disc 100, other values are also allowed as the asymmetry value on the standard. Therefore, the correlation information may be corrected to properly calculate the optimum recording laser power which realizes the asymmetry value other than "0" (e.g. values of "−0.05" and "0.1" etc.).

Moreover, in the example, the asymmetry value is adopted as one specific example of the reproduction quality of the OPC pattern; however, the present invention is not limited to this. For example, as the reproduction quality, a jitter value, a reproduction error rate, or the reflectance of the laser light LB may be used. Even if these various reproduction qualities are used, it is possible to receive the above-mentioned various benefits, by correcting the correlation information which indicates the correlation between the reproduction quality and the recording laser power, as described above.

(3) Second Operation Example

Next, with reference to FIG. 7 and FIG. 11, a second operation example of the information recording apparatus 300 in the example will be explained. Incidentally, even in the second operation example, the recording operation of recording the data into the L1 layer will be discussed as a specific example.

At first, with reference to FIG. 7, the entire flow of the second operation example of the information recording apparatus 300 in the example will be discussed. FIG. 7 is a flowchart conceptually showing an entire flow of the second operation example.

As shown in FIG. 7, even in the second operation example, substantially the same operations as in the first operation example are performed. Namely, the optical disc is loaded (the step S101), the OPC pattern is recorded in order to calculate the optimum recording laser power in the L1 layer (the step S102), the asymmetry is measured (the step S103), and the correlation information is prepared (the step S104).

Particularly in the second operation example, as opposed to the first operation example, the optimum recording laser power is calculated without the correction of the correlation information (the step S106). In other words, from the correlation information prepared in the step S104, the value of the recording laser power which realizes a targeted asymmetry value is calculated, as the optimum recording laser power.

Then, the waveform of the laser light irradiated in the data recording (i.e. a recording pulse) is corrected (step S201). The correction operation for the recording pulse will be discussed in detail later (refer to FIG. 8, etc.). Then, the data recording operation is performed with the laser light LB after the correction (the step S107). Then, it is judged whether or not the recording operation is ended (the step S108), and then, the operational flow returns to the step S107 to continue the recording operation, or the recording operation is ended.

Next, the correction operation for the recording pulse in the step S201 in FIG. 7 will be discussed with reference to FIG. 8 to FIG. 11. FIG. 8 and FIG. 10 are explanatory diagrams showing the waveform of the recording pulse before and after the correction. FIG. 9 and FIG. 11 are graphs conceptually showing the correlation information which indicates the correlation between the asymmetry and the recording laser power, and practical correlation information after the correction of the pulse waveform.

As shown in FIG. 8, the pulse of the laser light LB used on the information recording apparatus 300 in the example is made by combining a short pulse and a long pulse. In other words, it is made by combining the ON state of the short pulse, the OFF state of the short pulse, the ON state of the long pulse and the OFF state of the long pulse. Then, the OPC is performed with the laser light LB based on a pulse A shown in the upper part of FIG. 8. On the other hand, in actually recording the data, the recording is performed with the laser light LB based on a pulse B shown in the lower part of FIG. 8. Specifically, the pulse B has the short pulse with a larger pulse width, as compared to the pulse A. More specifically, the duty ratio of the short pulse in the pulse B is preferably about 5 to 10% greater than that of the short pulse in the pulse A. The information recording apparatus 300 in the example preferably has strategies, each of which defines respective one of the pulse A and the pulse B. However, even in the case where the information recording apparatus 300 has only either one of the strategies, it is enough if it has information, such as the duty ratio, which can limit the other pulse waveform. Then, on the basis of the strategies which define the pulse waveforms, the laser light LB is irradiated on the basis of the pulse B, by the operation of the LD driver 358 under the control of the CPU 354, to thereby record the data.

The following advantage is obtained by correcting the recording pulse of the laser light LB in recording the data in this manner. Specifically, the correlation information obtained by the OPC, shown in a graph indicated by a thick line in FIG. 9, is obtained by irradiating the laser light LB through the L0 layer in which the data is unrecorded. However, since the laser light LB is irradiated through the L0 layer in which the data is already recorded in actually recording the data into the L1 layer, it can hardly said that the optimum recording laser power obtained by the correlation information is always optimum. At this time, by correcting the recording pulse of the laser light LB, the asymmetry of the recorded data follows the correlation information as shown in a graph indicated by a dashed line in FIG. 9. The correlation information shown by the graph indicated by the dashed line is substantially equal to the correlation information obtained by the OPC performed by irradiating the laser light LB through the L0 layer in which the data is already recorded, as explained in the first operation example. In other words, by recording the data with the laser light LB based on the pulse B and the optimum recording laser power P2 obtained by the OPC, the data is recorded in accordance with the correlation information shown in the dashed line. By this, substantially, it is possible to realize the same recording operation as in the case where the data is recorded with the recording laser power P1 corresponding to the optimum recording laser power when the laser light LB is irradiated through the L0 layer in which the data is already recorded. Therefore, even in the second operation example, it is possible to receive the various benefits provided for the above-mentioned first operation example.

Moreover, the present invention is not limited to increasing the duty ratio of the short pulse, but the duty ratio of the short pulse may be reduced, as shown in FIG. 10. For example, the duty ratio of the short pulse in the pulse B used for the data recording is preferably about 5 to 10% less than that of the short pulse in the pulse A used for the OPC. Even if the pulse width of the laser light LB is reduced, it is possible to perform the data recording in accordance with the correlation information shown in a graph indicated by a dashed line, without in accordance with the correlation information obtained by the OPC shown in a graph indicated by a thick line as shown in FIG. 11. Then, the correlation information shown in the graph indicated by the dashed line is substantially equal to the correlation information obtained by the OPC performed by irradiating the laser light LB through the L0 layer in which the data is already recorded. In other words, by recording the data with the laser light LB based on the pulse B and the optimum recording laser power P2 obtained by the OPC, the data is recorded in accordance with the correlation information shown in the dashed line. By this, substantially, it is possible to realize the same recording operation as in the case where the data is recorded with the recording laser power P1 corresponding to the optimum recording laser power when the laser light LB is irradiated through the L0 layer in which the data is already recorded. Therefore, it is possible to receive the various benefits provided for the above-mentioned first operation example.

Incidentally, in the above-mentioned embodiment, the dual layer type optical disc is explained as the specific example of the optical disc 100. However, obviously, even the multi-layer type optical disc having three or more recording layers can receive the above-mentioned various benefits by adopting the same structure.

In the above-mentioned example, the optical disc 100 is explained as one example of the information recording medium, and the recorder related to the optical disc 100 is explained as one example of the information recording apparatus. The present invention, however, is not limited to the optical disc and the recorder thereof, and can be applied to other various high-density-recording or high-transmission-rate information recording media, and the recorders thereof.

The present invention is not limited to the above-described examples, and various changes may be made, if desired, without departing from the essence or spirit of the invention which can be read from the claims and the entire specification. An information recording apparatus and method, and a computer program for recording control, all of which involve such changes, are also intended to be within the technical scope of the present invention.

INDUSTRIAL APPLICABILITY

The information recording apparatus and method, and the computer program, all of which are according to the present invention, can be applied to a recorder or the like which is related to a high-density optical disc for consumer or industrial use, on which various information can be recorded at high density. Moreover, they can be applied to a recording apparatus or the like, which are mounted on or can be connected to various computer equipment for consumer or industrial use, for example.

The invention claimed is:

1. An information recording apparatus, comprising:
   a recording device for recording record information, by irradiating laser light with a variable recording power, onto an information recording medium comprising: a first recording layer into which the record information is recorded; and a second recording layer into which the record information is recorded through said first recording layer;
   a calculating device for recording test information for test writing by irradiating said second recording layer with the laser light through a recording area in which the record information is unrecorded in said first recording layer with said recording device, to thereby calculate an optimum power of the laser light in recording the record information by irradiating said second recording layer with the laser light through a recording area in which the record information is already recorded in said first recording layer; and
   a controlling device for controlling said recording device to irradiate the laser light with the optimum power calculated by said calculating device, in recording the record information into said second recording layer,
   wherein said calculating device calculates the optimum power by correcting correlation information which indicates a correlation between reproduction quality of the test information and the recording power.

2. The information recording apparatus according to claim 1, wherein said calculating device corrects the correlation information, on the basis of a difference between a feature of the laser light irradiated through the recording area in which the record information is unrecorded in said first recording layer and a feature of the laser light irradiated through the recording area in which the record information is already recorded in said first recording layer.

3. The information recording apparatus according to claim 1, wherein
   transmittance for the laser light is reduced in said first recording layer by recording the record information therein, and
   said calculating device corrects the correlation information to make the calculated optimum power greater than an optimum power indicated by the correction information before the correction.

4. The information recording apparatus according to claim 1, wherein
   transmittance for the laser light is increased in said first recording layer by recording the record information therein, and
   said calculating device corrects the correlation information to make the calculated optimum power less than an optimum power indicated by the correction information before the correction.

5. The information recording apparatus according to claim 1, wherein said controlling device controls said recording device to irradiate the laser light having a predetermined waveform which is different from a waveform of the laser light for recording the test information.

6. An information recording method in an information recording apparatus, comprising:
   a recording device for recording record information, by irradiating laser light with a variable recording power, onto an information recording medium comprising: a first recording layer into which the record information is recorded; and a second recording layer into which the record information is recorded through said first recording layer, said information recording method comprising:

a calculating process of recording test information for test writing by irradiating said recording layer with the laser light through a recording area in which the record information is unrecorded in said first recording layer with said second recording device, to thereby calculate an optimum power of the laser light in recording the record information by irradiating said second recording layer with the laser light through a recording area in which the record information is already recorded in said first recording layer; and a controlling process of controlling said recording device to irradiate said second recording layer with the laser light, with the calculated optimum power and through the recording area in which the record information is already recorded in said first recording layer, in recording the record information into said second recording layer, wherein said calculating process calculates the optimum power by correcting correlation information which indicates a correlation between reproduction quality of the test information and the recording power.

* * * * *